H. D. RANKIN.
DIGESTING APPARATUS.
APPLICATION FILED APR. 24, 1916.
1,300,875.
Patented Apr. 15, 1919.
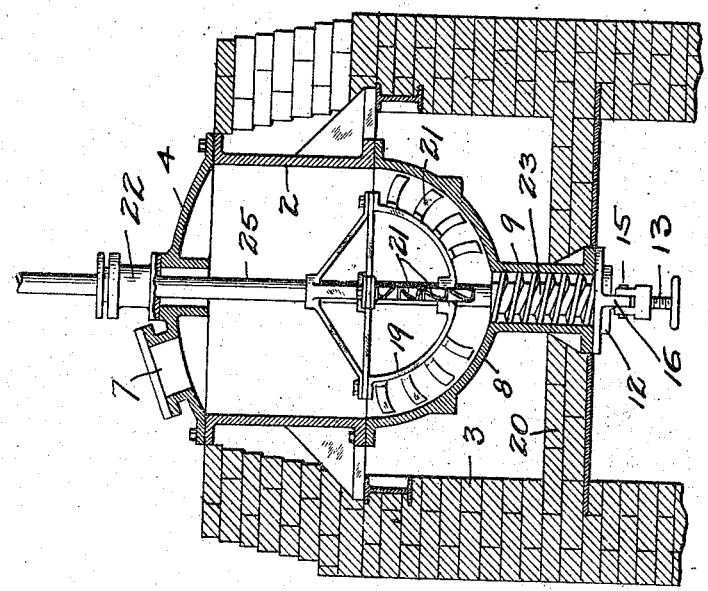
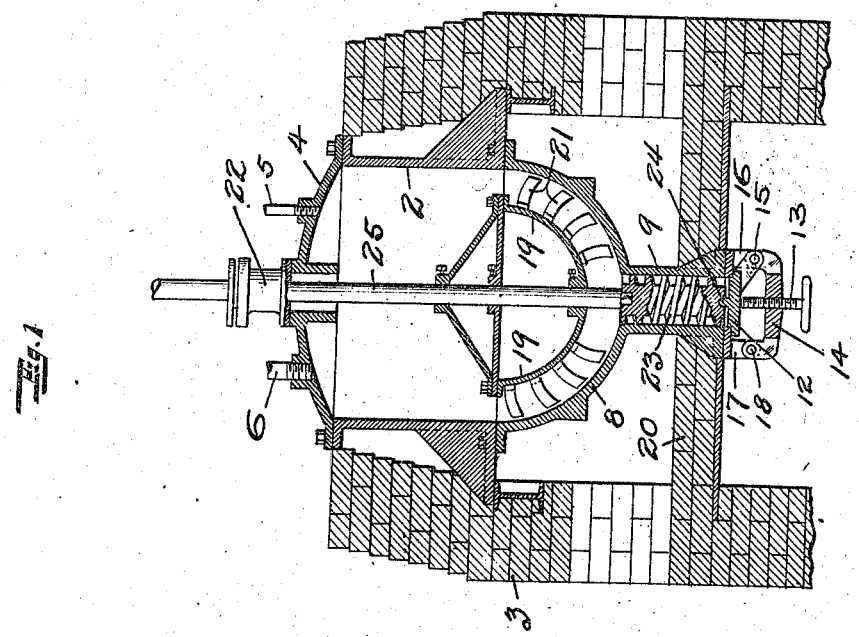
WITNESSES:
J. B. Gardner
INVENTOR.
H. D. RANKIN
BY White & Prost
HIS ATTORNEYS.

UNITED STATES PATENT OFFICE.

HARRY D. RANKIN, OF SAN FRANCISCO, CALIFORNIA, ASSIGNOR TO CORROSION EXTRACTION COMPANY, A CORPORATION.

DIGESTING APPARATUS.

1,300,875.

Specification of Letters Patent.  Patented Apr. 15, 1919.

Application filed April 24, 1916. Serial No. 93,128.

*To all whom it may concern:*

Be it known that I, HARRY D. RANKIN, a citizen of the United States, and a resident of the city and county of San Francisco, State of California, have invented a certain new and useful Digesting Apparatus, of which the following is a specification.

The invention relates to an apparatus in which materials or substances are treated for the purpose of decomposing, transposing, dissolving, internally rearranging or rendering them soluble.

An object of the invention is to provide an apparatus for agitating a mixture of liquid and material under pressure, while subjecting it to a high temperature.

Another object of the invention is to provide means for maintaining a uniform mixture during the digesting operation.

The invention possesses other advantageous features, some of which, with the foregoing, will be set forth at length in the following description, where I shall outline in full that form of the invention which I have selected for illustration in the drawings accompanying and forming part of the present specification. In said drawings I have shown only one form of my invention, but it is to be understood that I do not limit myself to such form, since the invention may be embodied in a multiplicity of forms, each comprising a species of my invention.

Referring to said drawings:

Figure 1 is a vertical section of one form of the apparatus of my invention.

Fig. 2 is a vertical section taken at right angles to that shown in Fig. 1.

The apparatus comprises a vessel or retort 2 made of suitable material to resist the action of the mixture contained therein. The vessel is preferably arranged within a furnace 3 formed with suitable inlet and outlet passages. The vessel is closed at the upper end by a cover plate 4 which is provided with a valve controlled inlet pipe 5, for the liquid, a valve controlled outlet pipe 6 for the gases and vapors generated in the vessel, and a closable opening 7 for the solid or semi-solid material to be treated. The vessel is normally tightly closed, so that when heat is applied thereto, a pressure is produced therein. The bottom 8 of the vessel is preferably hemi-spherical in form and is provided at its lower portion with a discharge passage 9, which is closed at the lower end by a plate 12, pressed tightly to its seat by a screw 13, bearing in the lever 14 which is pivoted at 15 to the bracket 16, and the plate 12 is also pivoted at 15 to the bracket 16. The other end of the lever is detachably secured to the bracket 17 by the pin 18. The discharge passage 9 extends through the bottom wall 20 of the furnace, so that access to the discharge gate may be readily had.

Arranged within the vessel and preferably in the bottom portion thereof is an agitator, comprising a plurality of semi-circular arms 19 having stirrers 21 attached thereto and extending into close proximity to the bottom 8. The agitator is secured to a rotatable shaft 25 which passes through a suitable stuffing box 22 in the cover 4. The agitator is rotated during the heating of the mixture so that agglomeration of the mass is prevented.

In order to prevent the mixture being treated from lodging in the discharge passage, where it would not be subjected to agitation nor the proper temperature, means are arranged in the passage for returning to the vessel any material which passes into the discharge passage. This means preferably comprises a screw conveyer 23, which rotates in such direction that it carries material upward into the vessel. The conveyer is provided on its upper end with a seat for engagement with the squared end of the shaft 25, so that the conveyer is rotated with the agitator. The lower end of the conveyer bears on a projection 24 on the plate 12. When the discharge gate is opened, the conveyer screw drops out and the contents are discharged.

I claim:

1. In a digesting apparatus, a vessel, a vertically disposed discharge passage arranged at the bottom of the vessel, rotatable means in said passage for returning material from the passage into the vessel and mechanism for rotating said means.

2. In a digesting apparatus, a vessel, a discharge passage arranged at the bottom of the vessel and a rotary conveyer in said passage arranged to convey material deposited therein into the vessel.

3. In a digesting apparatus, a vessel, a discharge passage arranged at the bottom of the vessel, means in said passage for conveying material deposited therein into the vessel and an agitator in said vessel connected to said means.

4. In a digesting apparatus, a vessel, a discharge passage arranged at the bottom of the vessel, a screw conveyer arranged in said passage and a rotatable agitator in the vessel connected to said conveyer.

In testimony whereof, I have hereunto set my hand at San Francisco, California, this 15th day of April, 1916.

HARRY D. RANKIN.

In presence of—
  H. G. PROST.